United States Patent [19]

Tutt et al.

[11] Patent Number: 4,872,064

[45] Date of Patent: Oct. 3, 1989

[54] SYSTEM FOR SELECTIVE SCALING OF DIGITAL VIDEO IMAGES

[75] Inventors: Timothy T. Tutt, Skokie; Mark Westmeyer, Elmhurst; Oscar Khutoryansky, Glenview, all of Ill.

[73] Assignee: Interand Corporation, Chicago, Ill.

[21] Appl. No.: 110,001

[22] Filed: Oct. 19, 1987

[51] Int. Cl.[4] .............................................. H04N 1/393
[52] U.S. Cl. ...................................... 358/464; 358/77;
358/456; 358/447; 358/451; 382/47
[58] Field of Search ............... 358/287, 284, 283, 282, 358/909, 77; 382/47

[56] References Cited

U.S. PATENT DOCUMENTS

| 4,381,547 | 4/1983 | Ejiri | 382/47 |
| 4,528,693 | 7/1985 | Pearson et al. | 358/287 |
| 4,610,026 | 9/1986 | Tabata et al. | 382/47 |
| 4,680,720 | 7/1987 | Yoshii et al. | 358/282 |
| 4,725,892 | 2/1988 | Suzuki et al. | 358/287 |
| 4,733,230 | 3/1988 | Kurihara et al. | 358/283 |
| 4,803,558 | 2/1989 | Hiratsuka et al. | 358/283 |

Primary Examiner—Edward L. Coles, Sr.
Assistant Examiner—Kim Yen Vu
Attorney, Agent, or Firm—Alan R. Loudermilk

[57] ABSTRACT

Method and apparatus for the selective scaling, such as magnification and reduction, of video images stored as collections of image pels in a video memory. A lookup table is provided for determination of the values of the scaled image pels. A framing matrix of unscaled image pels is established for each scaled image pel. The framing matrix for the scaled image pels determines the outputs read out of the lookup table, and derivatively, determines the values of the scaled image pels. The scaled image pels are stored in the video memory for subsequent display or processing.

2 Claims, 16 Drawing Sheets

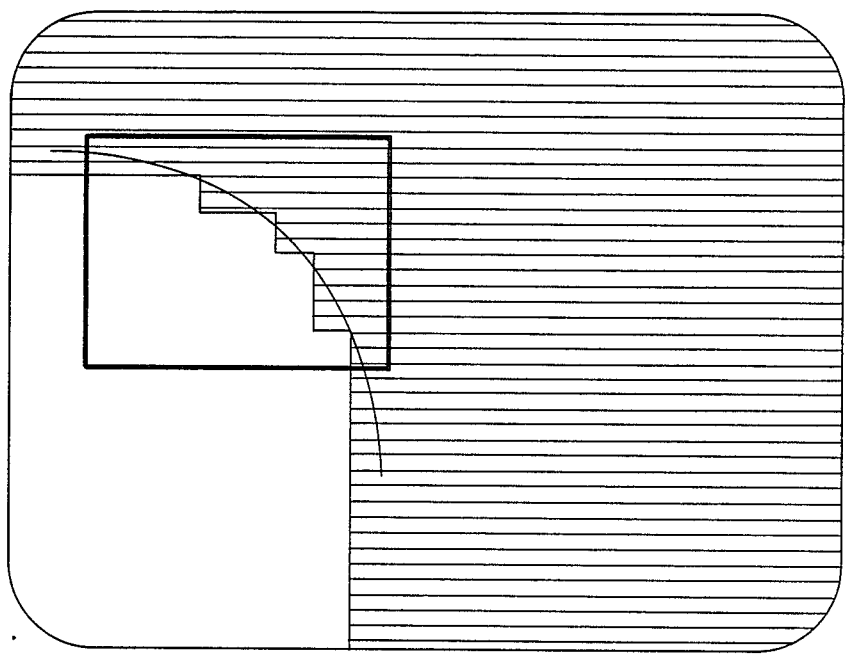
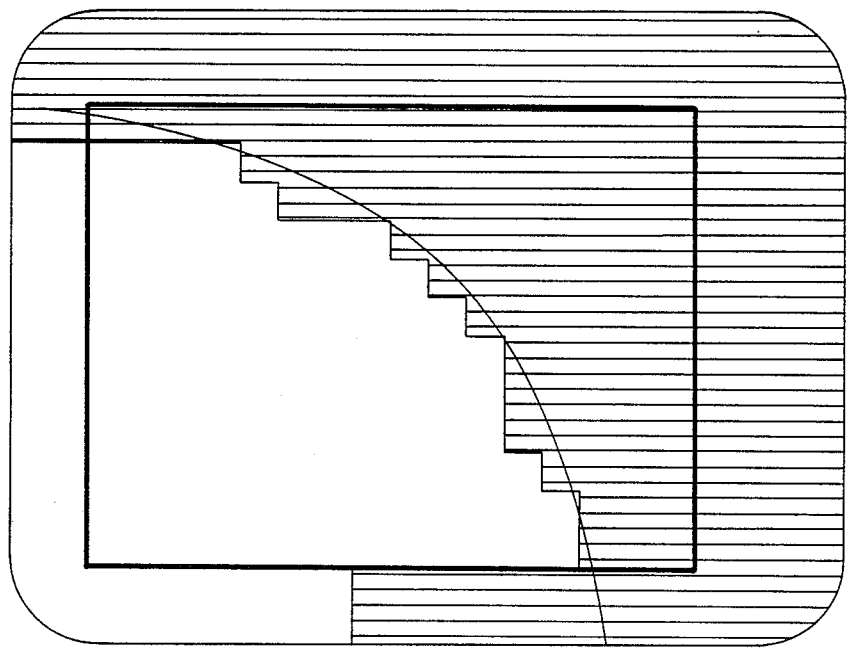
FIG. 1

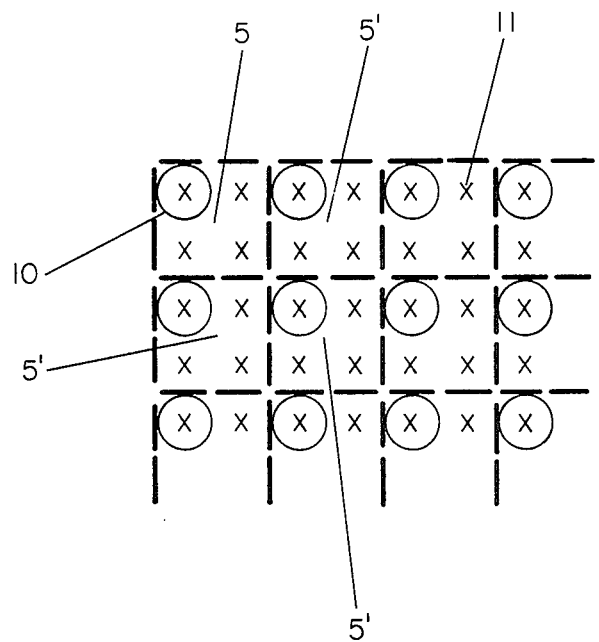
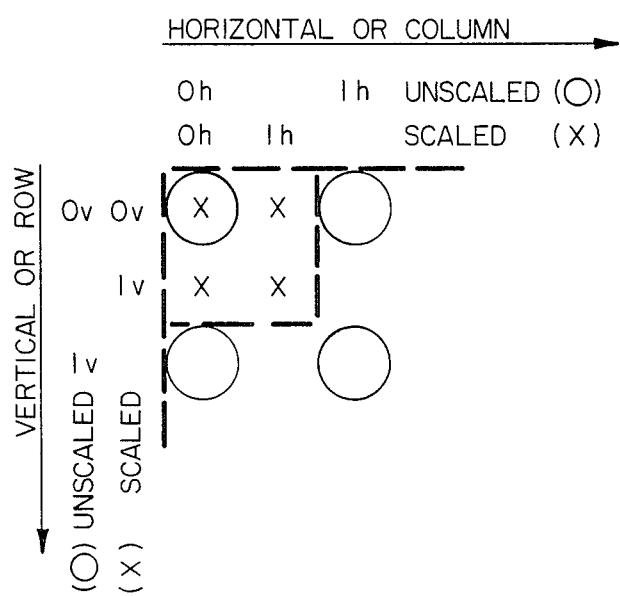
FIG. 3

ALL POSSIBLE COMBINATIONS OF INPUT PEL VALUES FOR A TWO-BY-TWO SCALING APPROACH

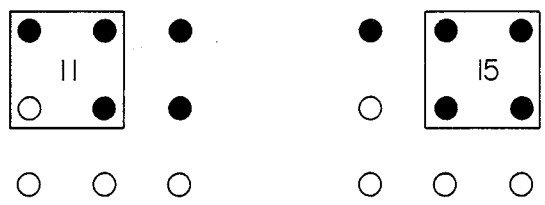
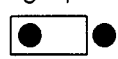
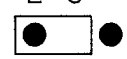
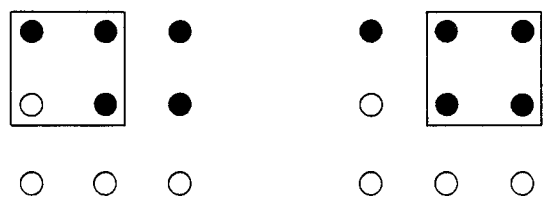
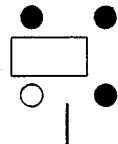
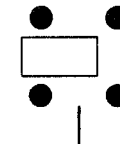
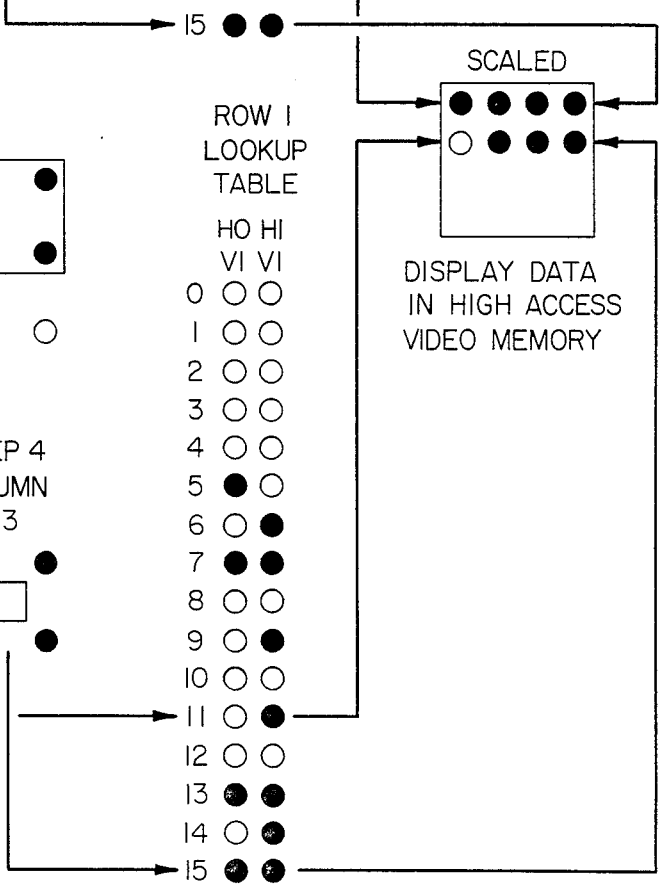
FIG. 8

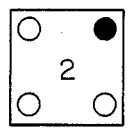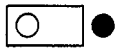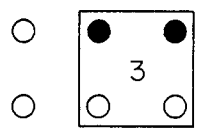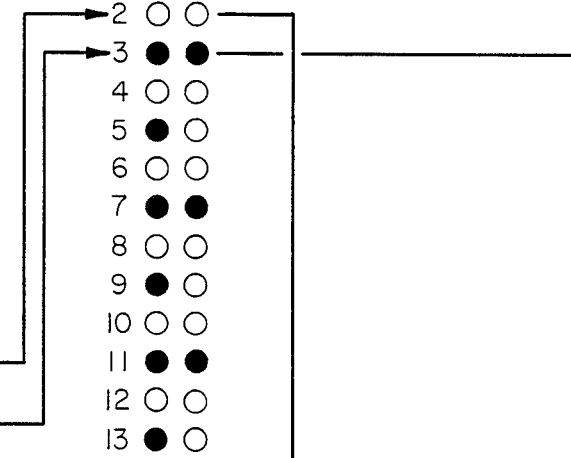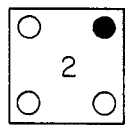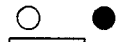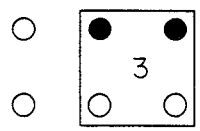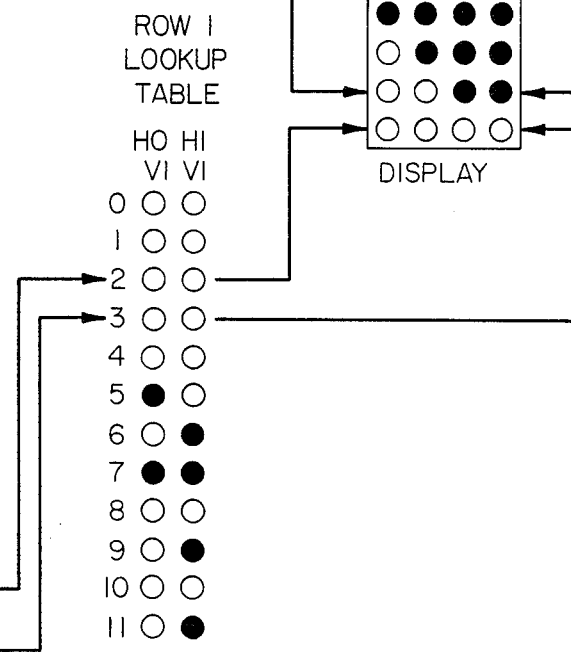
FIG. 9

TABLE OF BITS IN VS. BITS OUT
FOR SEVERAL SCALING FACTORS

| SCALING FACTOR | BITS IN | BITS OUT |
|---|---|---|
| MAGNIFY 2/1 | 1 | 2 (R) * |
| MAGNIFY 7/5 | 1 | 2 |
|  | 1 | 1 |
|  | 1 | 2 |
|  | 1 | 1 |
|  | 1 | 1 (R) |
| MAGNIFY 6/5 | 1 | 2 |
|  | 1 | 1 |
|  | 1 | 1 |
|  | 1 | 1 |
|  | 1 | 1 |
| REDUCE 2/1 | 2 | 1 (R) |
| REDUCE 5/7 | 2 | 1 |
|  | 1 | 1 |
|  | 1 | 1 |
|  | 2 | 1 |
|  | 1 | 1 (R) |
| REDUCE 6/7 | 2 | 1 |
|  | 1 | 1 |
|  | 1 | 1 |
|  | 1 | 1 |
|  | 1 | 1 |

SCALER DATA TABLES - STROKE RECOGNITION METHOD

;**********************************************

ADDRESS = VERT HORZ PATTERN

PATTERN                 VERTICAL            HORIZONTAL
        MSB...LSB               SEQUENCE            SEQUENCE
        ─────────               ────────            ──────────

6           ;NUMBER OF TABLES

5 TO 6   ENLARGEMENT
                    6           ;NEM
                    5           ;DOM
1010 1010 1010 1010             ;VERT 0             HORZ 0
1100 1100 1100 1100             ;VERT 0             HORZ 1
1100 1100 1100 1100             ;VERT 0             HORZ 2
1000 1000 1000 1000             ;VERT 0             HORZ 3
1010 1010 1010 1010             ;VERT 0             HORZ 4
1010 1010 1010 1010             ;VERT 0             HORZ 5
1111 0000 1111 0000             ;VERT 1             HORZ 0
1111 1111 0000 0000             ;VERT 1             HORZ 1
1111 1110 0000 0000             ;VERT 1             HORZ 2
1111 1010 1100 0000             ;VERT 1             HORZ 3
1111 0000 1111 0000             ;VERT 1             HORZ 4
1111 0000 1111 0000             ;VERT 1             HORZ 5
1111 0000 1111 0000             ;VERT 2             HORZ 0
1111 1110 0000 0000             ;VERT 2             HORZ 1
1111 1110 1100 0000             ;VERT 2             HORZ 2
1111 1010 1100 0000             ;VERT 2             HORZ 3
1111 1010 1110 0000             ;VERT 2             HORZ 4
1111 0000 1111 0000             ;VERT 2             HORZ 5
1010 0000 1010 0000             ;VERT 3             HORZ 0
1110 1110 1100 0000             ;VERT 3             HORZ 1
1110 1110 1100 0000             ;VERT 3             HORZ 2
1110 1010 1100 0000             ;VERT 3             HORZ 3
1110 1010 1110 0000             ;VERT 3             HORZ 4
1110 1010 1110 0000             ;VERT 3             HORZ 5
1010 1010 1010 1010             ;VERT 4             HORZ 0
1100 1100 1100 1100             ;VERT 4             HORZ 1
1110 1110 1100 1000             ;VERT 4             HORZ 2
1110 1010 1100 1000             ;VERT 4             HORZ 3
1110 1010 1110 1000             ;VERT 4             HORZ 4
1010 1010 1010 1000             ;VERT 4             HORZ 5
1010 1010 1010 1010             ;VERT 5             HORZ 0
1100 1100 1100 1100             ;VERT 5             HORZ 1
1100 1100 1100 1100             ;VERT 5             HORZ 2
1110 1010 1100 1000             ;VERT 5             HORZ 3
1010 1010 1010 1000             ;VERT 5             HORZ 4
1010 1010 1010 1010             ;VERT 5             HORZ 5
```

Figure 13

```
;***********************************************************
;
;         6 TO 5 REDUCTION
;                        5              ;NEM
;                        6              ;DOM
 1010 1010 1010 1010                    ;VERT 0          HORZ 0
 1010 1010 1010 1010                    ;VERT 0          HORZ 1
 1010 1010 1010 1010                    ;VERT 0          HORZ 2
 1110 1110 1110 1110                    ;VERT 0          HORZ 3
 1100 1100 1100 1100                    ;VERT 0          HORZ 4
 1010 1010 1010 1010                    ;VERT 1          HORZ 0
 1010 1010 1010 1010                    ;VERT 1          HORZ 1
 1110 1010 1110 1010                    ;VERT 1          HORZ 2
 1110 1110 1110 1100                    ;VERT 1          HORZ 3
 1110 1110 1100 1100                    ;VERT 1          HORZ 4
 1010 1010 1010 1010                    ;VERT 2          HORZ 0
 1110 1010 1110 1010                    ;VERT 2          HORZ 1
 1110 1010 1110 1000                    ;VERT 2          HORZ 2
 1110 1110 1110 1100                    ;VERT 2          HORZ 3
 1110 1110 1100 1100                    ;VERT 2          HORZ 4
 1111 1010 1111 1010                    ;VERT 3          HORZ 0
 1111 1010 1111 1000                    ;VERT 3          HORZ 1
 1111 1010 1111 1000                    ;VERT 3          HORZ 2
 1111 1110 1110 1000                    ;VERT 3          HORZ 3
 1111 1110 1100 1100                    ;VERT 3          HORZ 4
 1111 0000 1111 0000                    ;VERT 4          HORZ 0
 1111 1010 1111 0000                    ;VERT 4          HORZ 1
 1111 1010 1111 0000                    ;VERT 4          HORZ 2
 1111 1110 1111 0000                    ;VERT 4          HORZ 3
 1111 1111 1100 0000                    ;VERT 4          HORZ 4
;
;***********************************************************
;
;         7 TO 5 REDUCTION
;                        5              ;NEM
;                        7              ;DOM
 1010 1010 1010 1010                    ;VERT 0          HORZ 0
 1110 1110 1110 1110                    ;VERT 0          HORZ 1
 1100 1100 1100 1100                    ;VERT 0          HORZ 2
 1010 1010 1010 1010                    ;VERT 0          HORZ 3
 1110 1110 1110 1110                    ;VERT 0          HORZ 4
 1111 1010 1111 1010                    ;VERT 1          HORZ 0
 1111 1110 1110 1000                    ;VERT 1          HORZ 1
 1111 1110 1100 1100                    ;VERT 1          HORZ 2
 1111 1010 1111 1010                    ;VERT 1          HORZ 3
 1111 1110 1111 1100                    ;VERT 1          HORZ 4
 1111 0000 1111 0000                    ;VERT 2          HORZ 0
 1111 1110 1111 0000                    ;VERT 2          HORZ 1
 1111 1111 1100 0000                    ;VERT 2          HORZ 2
 1111 1010 1111 0000                    ;VERT 2          HORZ 3
 1111 1111 1111 0000                    ;VERT 2          HORZ 4
 1010 1010 1010 1010                    ;VERT 3          HORZ 0
 1110 1110 1110 1110                    ;VERT 3          HORZ 1
 1110 1110 1100 1100                    ;VERT 3          HORZ 2
 1110 1010 1110 1010                    ;VERT 3          HORZ 3
 1110 1110 1110 1100                    ;VERT 3          HORZ 4
 1111 1010 1111 1010                    ;VERT 4          HORZ 0
 1111 1110 1111 1100                    ;VERT 4          HORZ 1
 1111 1111 1100 1100                    ;VERT 4          HORZ 2
 1111 1010 1111 1000                    ;VERT 4          HORZ 3
 1111 1110 1110 1000                    ;VERT 4          HORZ 4
```

Figure 13 (cont.)

```
;********************************************************
;
;       5 TO 7 ENLARGEMENT
;
                        7               ;NEM
                        5               ;DOM
1010 1010 1010 1010     ;VERT 0         HORZ 0
1100 1100 1100 1100     ;VERT 0         HORZ 1
1000 1000 1000 1000     ;VERT 0         HORZ 2
1010 1010 1010 1010     ;VERT 0         HORZ 3
1100 1100 1100 1100     ;VERT 0         HORZ 4
1000 1000 1000 1000     ;VERT 0         HORZ 5
1010 1010 1010 1010     ;VERT 0         HORZ 6
1111 0000 1111 0000     ;VERT 1         HORZ 0
1111 1110 0000 0000     ;VERT 1         HORZ 1
1111 1010 1100 0000     ;VERT 1         HORZ 2
1111 0000 1110 0000     ;VERT 1         HORZ 3
1111 1110 0000 0000     ;VERT 1         HORZ 4
1111 1010 1100 0000     ;VERT 1         HORZ 5
1111 0000 1111 0000     ;VERT 1         HORZ 6
1010 0000 1010 0000     ;VERT 2         HORZ 0
1110 1110 1100 0000     ;VERT 2         HORZ 1
1110 1010 1100 0000     ;VERT 2         HORZ 2
1010 1010 1010 0000     ;VERT 2         HORZ 3
1100 1100 1100 0000     ;VERT 2         HORZ 4
1110 1010 1100 0000     ;VERT 2         HORZ 5
1110 1010 1110 0000     ;VERT 2         HORZ 6
1010 1010 1010 1010     ;VERT 3         HORZ 0
1100 1100 1100 1000     ;VERT 3         HORZ 1
1010 1010 1000 1000     ;VERT 3         HORZ 2
1010 1010 1010 1010     ;VERT 3         HORZ 3
1100 1100 1100 1100     ;VERT 3         HORZ 4
1100 1000 1100 1000     ;VERT 3         HORZ 5
1010 1010 1010 1000     ;VERT 3         HORZ 6
1111 0000 1111 0000     ;VERT 4         HORZ 0
1111 1110 0000 0000     ;VERT 4         HORZ 1
1111 0000 1100 0000     ;VERT 4         HORZ 2
1111 0000 1111 0000     ;VERT 4         HORZ 3
1111 1111 0000 0000     ;VERT 4         HORZ 4
1111 1010 0000 0000     ;VERT 4         HORZ 5
1111 0000 1110 0000     ;VERT 4         HORZ 6
1010 0000 1010 0000     ;VERT 5         HORZ 0
1110 1110 1100 0000     ;VERT 5         HORZ 1
1110 1010 1100 0000     ;VERT 5         HORZ 2
1110 0000 1110 0000     ;VERT 5         HORZ 3
1110 1110 0000 0000     ;VERT 5         HORZ 4
1110 1010 1100 0000     ;VERT 5         HORZ 5
1110 1010 1110 0000     ;VERT 5         HORZ 6
1010 1010 1010 1010     ;VERT 6         HORZ 0
1100 1100 1100 1100     ;VERT 6         HORZ 1
1110 1010 1100 1000     ;VERT 6         HORZ 2
1010 1010 1010 1000     ;VERT 6         HORZ 3
1100 1100 1100 1000     ;VERT 6         HORZ 4
1110 1010 1100 1000     ;VERT 6         HORZ 5
1010 1010 1010 1000     ;VERT 6         HORZ 6
```

Figure 13 (cont.)

```
;***********************************************
;
;       1 TO 2    ENLARGEMENT
;
                        2               ;NEM
                        1               ;DOM
1010 1010 1010 1010                     ;VERT 0         HORZ 0
1000 1000 1000 1000                     ;VERT 0         HORZ 1
1010 0000 1010 0000                     ;VERT 1         HORZ 0
1110 1010 1100 0000                     ;VERT 1         HORZ 1
;
;***********************************************
;
;       2 TO 1    REDUCTION
;
                        1               ;NEM
                        2               ;DOM
1111 1111 1111 1110                     ;VERT 0         HORZ 0
```

Figure 13 (cont.)

SYSTEM FOR SELECTIVE SCALING OF DIGITAL VIDEO IMAGES

BACKGROUND OF THE INVENTION

1. Field of the Invention

This invention relates generally to the selective scaling, such as magnification and reduction, of still video images, the information for which is stored digitally in a single frame buffer memory; and more particularly concerns the method of determining the picture element values of the scaled image as a function of their positions relative to their counterparts in the unscaled image.

2. Description of Prior Art

Systems exist which can selectively scale still video images. One such system employs a video memory having considerably larger capacity in terms of display locations than the display has picture elements (pels). In the unscaled state, such systems display with adjacent pels data stored in every n'th memory element, rather than adjacent memory elements. Upon scaling (in this example by magnification), intervening, previously undisplayed memory elements are called into use, n growing successively smaller with each increase in magnification, until it reaches one, and adjacent pels display adjacent memory elements, covering a smaller portion of the subject. The opposite occurs in an image reduction.

Systems also exist which scale without using additional image data stored in memory. Typically, such systems create the data needed for magnification by replicating or averaging the values of the previously adjacent pels they will be separating.

Systems incorporating more memory than display capacity incur substantially higher costs for increased memory space and increased processing time needed to access and manipulate the image data, generally on a bit-by-bit basis. A further disadvantage is that the larger pel array may not be available. Very often the image was captured by a video camera connected to the same frame buffer memory which is storing and displaying the image. Therefore, all available pels are already being displayed and any scaling must be done solely with those pels. Those systems which create the magnification data y replication or averaging of "nearest neighbor" data incur certain image inaccuracies and artifacts. These inaccuracies are particularly counterproductive to the scaling of images consisting largely of narrow curvilinear strokes, such as handwriting and drawing. Averaging systems are at a particular disadvantage when the image data is only one bit per pel. Many display systems, including most facsimile systems and many computer displays are limited to two values (attributes) per pel. These are typically referred to as black/white systems, although many displays and screens are actually orange and black or green and black. Since these systems lack "grey", the average of two pels will have to be rounded to one of the two values—not a true average at all.

SUMMARY OF THE INVENTION

The present invention provides a method, and apparatus to scale still video images for which typically no more data exists in memory than is displayed in the unscaled state. Further, the present invention is highly effective in systems where there is only one bit (i.e. two attributes) per pel. The present invention includes a central processing unit (CPU) and firmware and employs a concept of stroke preservation, the primary purpose of which is to maintain the integrity of shape of interfaces between white and black areas during scaling.

For clarity herein the term PEL, which is a contraction of "PICTURE ELEMENT" and is commonly used to refer to the individual elements of a digitized display, to stand for both the display element itself and the memory element (data) which represents the display element. Thus, "alter the pel" is a clear and concise way of saying "alter the memory (data) element, which thereby alters the pel".

The present invention is operative on and with an original image, which is referred to as the unscaled image, resident in a frame buffer memory, and which has an array of memory elements having a one-to-one correspondence with the pels of an associated display, such that all of the memory elements of the image are displayed. The invention will scale (magnify or reduce) all or part of the image. This will create a new image, referred to as the scaled image. For example, assume a hypothetical 1000 by 1000 memory element frame buffer driving a corresponding 1000 by 1000 pel display. The center of the unscaled display is to be scaled by a magnification of two (2). Thus, from the center 500 by 500 memory elements, the present invention will produce a new 1000 by 1000 memory element array which will be displayed as a 1000 by 1000 pel scaled display. Clearly, where there were one-quarter million memory elements, the invention must now produce one-million memory elements.

To assist in understanding the present invention, imagine the newly scaled image to be on a transparent elastic sheet. Without changing the number of elements in this new scaled image, restore it, via the elastic sheet, to the same size as the unscaled image portion from which it was derived. In the example above, the magnified scaled image screen would be allowed to shrink to one-fourth area (half size each direction) and would now cover the center 500 by 500 pels of unscaled image from which the scaled image was derived. The scaled image can now be overlayed upon the unscaled image, and since the sheet is transparent, the two can be compared. Since the invention magnified linearly by two, and the elastic sheet reduced linearly by two, the image features will overlay. The scaled image, however, having been magnified linearly by two and four in area, will have four times as many pels. This gedanken experiment shows how the invention must create new pels (memory elements) at positions where no pels existed before. Since this was a two-to-one magnification, one-fourth of the new pels will overlay old pels. Had the scaling factor been six-to-five, only one-thirty-sixth of the new pels would lie upon old pels. In general, the invention derives all new pels from neighboring position old pels.

Essentially, the present invention compares the distribution of pels of the scaled image with that of the unscaled image, and assigns values to the scaled pels based on their contribution to maintaining the integrity of the unscaled image. A comparison is made for every two (2) horizontal by two (2) vertical matrix of pels of the unscaled image. The present invention determines the value of the pel of the scaled image, white or black, based on its proximity to white or black valued pels of the unscaled matrix. Emphasis is placed on the scaled pel's coincidence with a stroke or area existing in the unscaled matrix of two or more black pels adjacent horizontally, vertically or diagonally.

The number of possible white/black combinations in each 2×2 unscaled matrix is limited to 16. Moreover, the number of possible spatial relations between pels of the scaled display and the matrices of pels of the unscaled display in which they are framed is also finite, due to the repetition of pattern that occurs when the scaled and unscaled displays are (hypothetically) overlaid. The method of the present invention includes lookup tables identifying the scaled pel values for their possible positions relative to the unscaled matrices in which they are contained and the possible combinations of unscaled matrix pel values. These characteristics lend themselves to the speed and economies inherent in the iterative processing of finite patterns. In fact, depending on the degree of variability in scaling desired, the lookup table seldom needs to be larger than 16×(8×8 overlay matrix)=1024 elements, and serves to scale a display of millions of pels.

The principle of stroke preservation incorporated in the present invention results in scaled images having quality superior to that of scaled images obtained by methods in the prior art. This is particularly true in image reductions, wherein the present invention also includes the principle of "up/left adjacency". In reduction, the loss of image content is remarkably low, and the quality far surpasses that obtained by prior art reduction methods.

A principal object of the present invention is to scale images without requiring the presence of additional image data, while maintaining the geometric integrity of curvilinear interfaces between white and black image areas.

A second object of this invention is to scale images having only one bit per pel.

Another object of this invention is to allow a variety of image scaling factors.

Finally, it is another object of the present invention to scale images rapidly and economically.

BRIEF DESCRIPTION OF DRAWINGS

FIG. 1 illustrates highly magnified views of two different scalings of the same curvilinear interface between white and black portions of a still video image, showing the maintenance of the rates of change of the radius of curvature.

FIG. 3 is a symbolic diagram of the correspondence superimposition of a scaling ratio of two (2), showing the repetition of pattern and how the processing of one iteration of the pattern requires the inclusion of pels from the next iterations to the right, below and diagonally.

FIG. 8 is a symbolic diagram illustrating the processing of the top half of a 2×2 pel to a 4×4 pel scaling.

FIG. 9 is a symbolic diagram illustrating the processing of the bottom half of a 2×2 pel to a 4×4 pel scaling.

FIG. 12 is a table of bits in versus bits out for several scaling factors.

FIG. 13 is a scaling table for several scaling factors.

DETAILED DESCRIPTION OF PREFERRED EMBODIMENT

Figure 2:
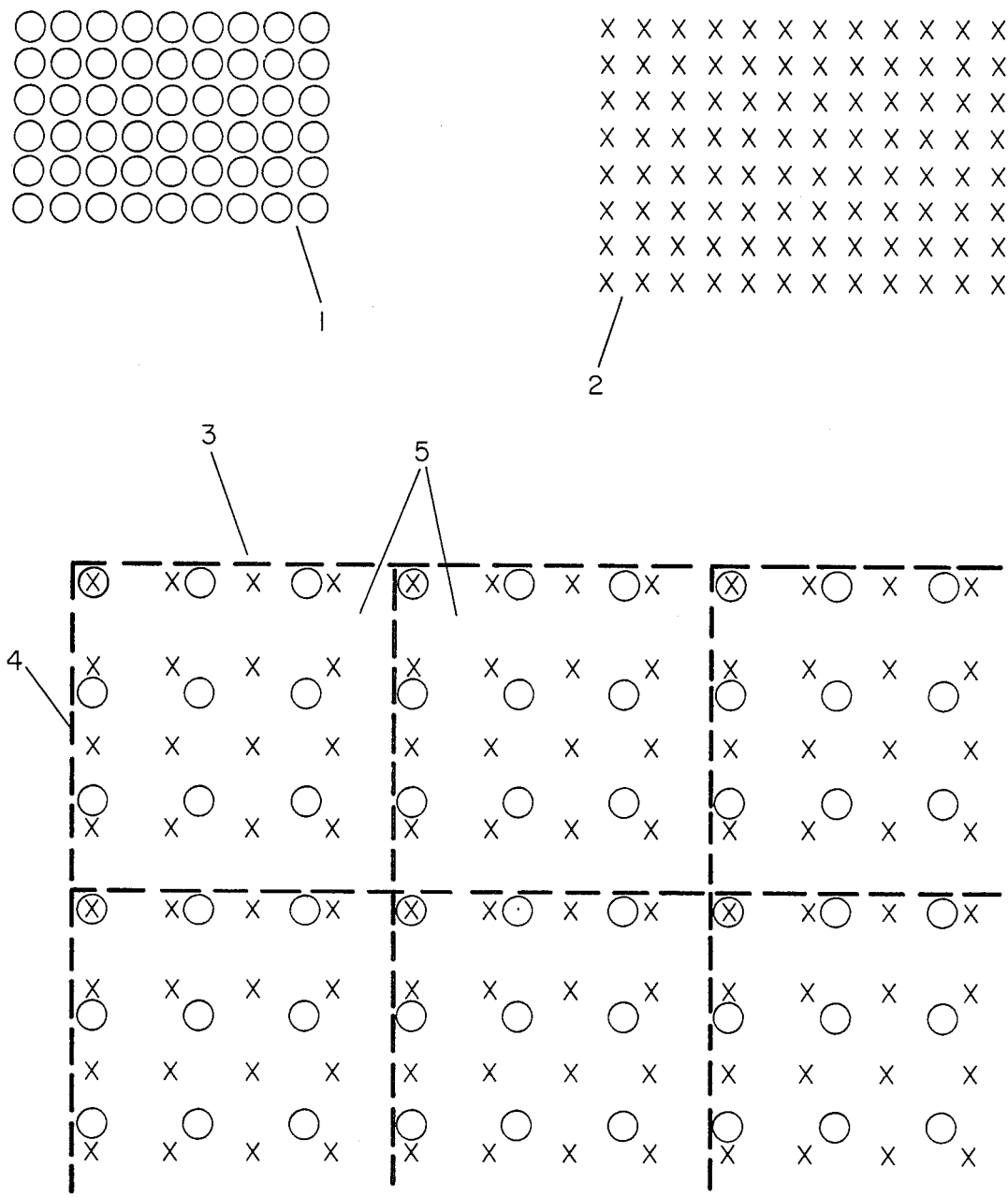
FIG. 2 is a symbolic diagram of a hypothetical 9×6 pel display scaled up by a factor of 1.33 to a 12×8 pel display, and a visual representation of the spatial correspondence (superimposition) performed by the present invention of the unscaled and scaled displays.

As is common in video image scaling, the present invention introduces more pels per unit area of displayed subject to magnify, and removes pels to reduce. For example, to double the size of an image, the method introduces an additional pel in the scaled state between every pair (horizontally and vertically) of what were adjacent pels in the unscaled state. Thus any portion of the image that had previously been represented by n pels horizontally and vertically is now represented by 2n pels in each direction and therefore is magnified by a factor of two (2). Any degree of scaling is possible. FIG. 2 illustrates symbolically the magnification of a hypothetical 9×6 pel display by 1.33 to a 12×8 pel display. In this and subsequent figures, the pels of the unscaled image are represented by circles, and the pels of the scaled image are represented by "X's". This representation provides maximum distinction between unscaled and scaled image pels, and when scaled pels fall directly upon unscaled pels, both are still easily distinguished. Thus, in FIG. 2 circle array 1 is the 9 by 6 pel unscaled image. X array 2 is the 12 by 8, 1.33-to-1, actually more accurately 4-to-3, scaled (in this case magnified) image. Combination array 3 shows the 12 by 8 scaled image pels (the X's) overlaid upon the 9 by 6 unscaled image pels (the circles). Notice that this is done by the elastic sheet method described above. Both arrays have been made equal in overall size. If these arrays had an actual image content, as opposed to being pel position indicators, the images would coincide within the limits of the accuracy of the scaling.

The present invention includes lookup tables specifying pel values of the scaled display based on value patterns of corresponding portions of the unscaled display. These tables are specific to discrete degrees of scaling and are prepared manually and would normally be stored in some form of non-volatile digital storage and downloaded to the lookup table hardware as required.

The tables are prepared as follows. Both the unscaled and scaled display pel patterns are expanded to a common identical size so that they can be superimposed spatially as shown in array 3 of FIG. 2. This is done by separating the pels of each display, unscaled and scaled, by a spacing factor, Sm for unscaled, Sn for scaled, such that the ratio of Sm over Sn equals the scaling ratio n over m. For example, to bring the scaled and unscaled patterns into coincidence when the scaling ratio is two-to-one (n=2, m=1, the scaling is a two times magnification), the spacing between pels for the unscaled (m) display, Sm must be two units and the spacing between pels of the scaled (n) display Sn must be one unit. Thus Sm over Sn is two over one, equals two, and the scaling ratio n over m is two over one, also equals two.

It is apparent that the overlay of scaled and unscaled pel position patterns results in a repeating pattern, each iteration of which is bordered by broken lines 4 in array 3 of FIG. 2. Thus the spatial or proximity relationship between each pel of the scaled display and the matrix of four (4) pels of the unscaled display in which it lies has to be determined only once, as that set of determinations will remain the same for all iterations. In the 4-to-3 (nominal 1.33-to-1) scaled example of FIG. 2, in each cell 5 there are sixteen (16) pels of the scaled display for which determination has to be made. Each of these determinations will be made on the basis of the proximity of the pel of the scaled display to the matrix of four (4) pels of the unscaled display in which it lies and on the values (white or black) of those pels of the unscaled display.

FIG. 3 illustrates the relationship between the scaled and unscaled pels of a display that is being scaled by a ratio of two (2). Here the overlay pattern repeats itself every two pels of the scaled display horizontally and vertically. This results in the need to determine the relationship of only four (4) pels of the scaled display to the framing matrix of pels of the unscaled display, and therefore is used here to simplify illustration. Each iteration 5 of the pattern includes only one pel 10 of the unscaled display, and because each determination requires a matrix of four (4) pels from the unscaled display, each determination will include pels of the unscaled display from adjacent iterations 5'. Directional protocol in the preferred embodiment is left to right and top to bottom, and therefore the extra pels of the unscaled display included in every determination are those from the iterations 5' immediately to the right, below, and diagonally right and below the pattern iteration being evaluated. Accordingly there is an overlap of use whereby pels of the unscaled display in the rows and columns bordering an iteration are employed in the determination of that iteration and of the following ones, both horizontally and vertically. One complete iteration of the full overlay pattern used in the scaling process is depicted in the bottom of FIG. 3, and includes the pel identification nomenclature that will be used in following descriptions. Each pel is designated by a horizontal position number followed by h and a vertical position number followed by v. Thus, pel "0h 0v" is the upper left hand corner pel.

The values (white or black) of the four (4) pels of the scaled display are determined by the values of the four (4) pels of the unscaled display by which they are surrounded, incorporating principles of coincidence and stroke preservation. By the coincidence rule, if unscaled pel 0h 0v, which is coincident with scaled pel 0h 0v, is black, then scaled pel 0h 0v should be determined black.

Stroke preservation applies to the determinations of values for scaled pels that lie between unscaled pels in the overlay. Consider scaled pel 1h 1v nested symmetrically among the four unscaled pels. If only two horizontally or vertically adjacent unscaled pels in the framing matrix are black, then the scaled pel 1h 1v will not be considered part of the stroke identified thereby and will be determined to be white. If however any two diagonally related unscaled pels are black or if any three unscaled pels are black, then scaled pel 1h 1v will be considered to be part of that diagonal line or black triangular area, and will be determined to be black. Obviously, if all four unscaled pels are black, then scaled pel 1h 1v will also be determined to be black.

The foregoing describes the basic principle of stroke preservation used in the preferred embodiment of the present invention. This principle can be modified or tailored to accommodate the nuances of various kinds of graphics in alternative embodiments In fact, minor variations to the principle are suggested based on empirical evaluation of image quality. Indeed, the principle of up/left adjacency is added to the primary principle universally for reductions. This addition contributes to the present invention's capability to reduce images while retaining content well beyond methods of the prior art. This additional principle is described below and in FIG. 7 in conjunction with the subject of reductions.

Figure 4:
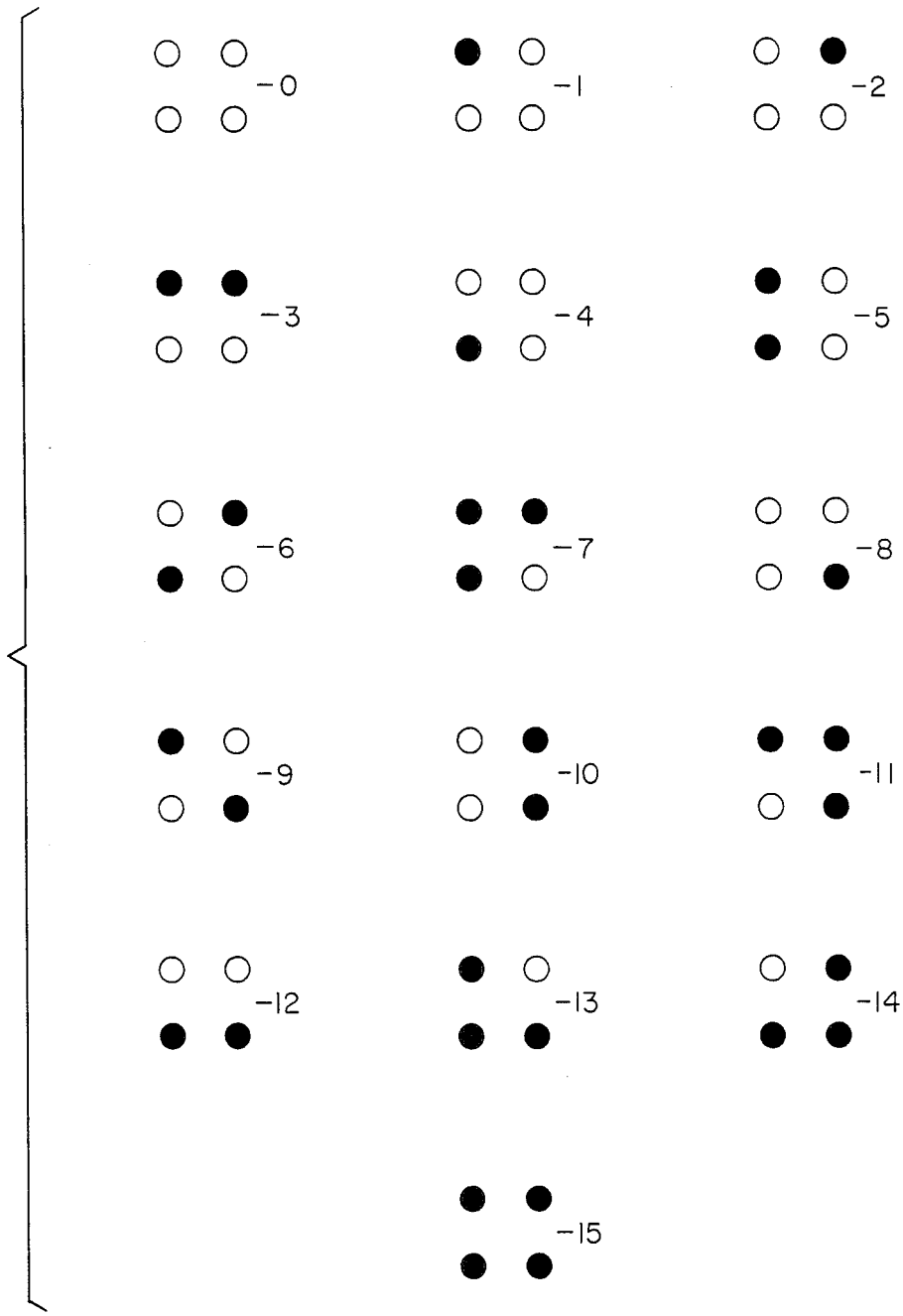
FIG. 4 illustrates the sixteen (16) possible combinations of white and black values of the four pels of the unscaled display that form each framing matrix independent from scaling ratio.
Figure 5:
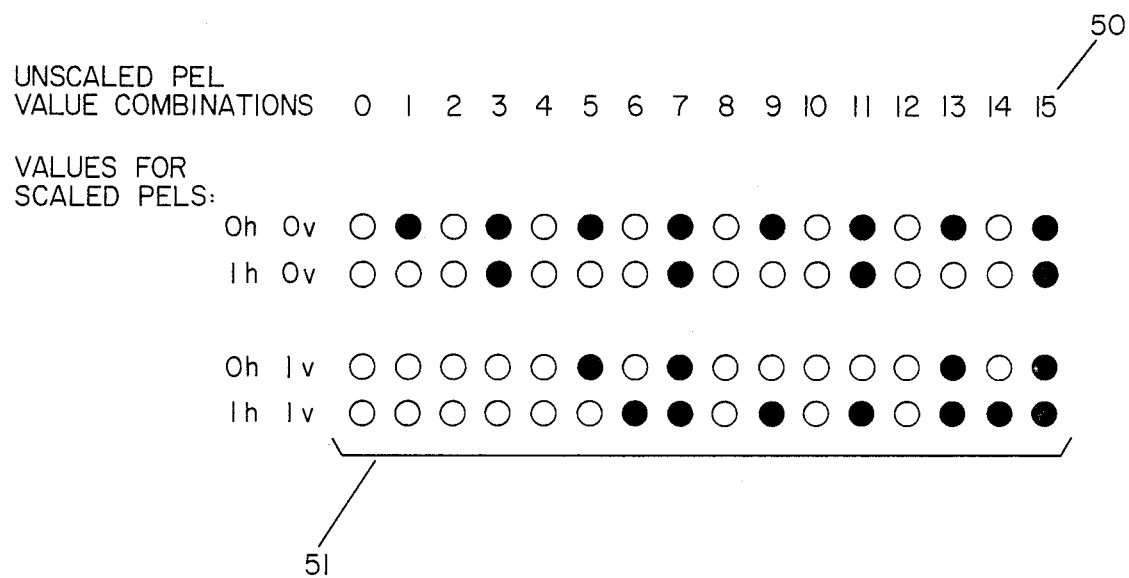
FIG. 5 is a symbolic diagram of the lookup table for a scaling ratio of two (2), showing the value for each of the four (4) scaled pels within an overlay iteration for each of the sixteen (16) combinations of white and black values of the four (4) pels of the unscaled framing matrix.

FIG. 4 illustrates the sixteen (16) possible combinations of white and black pels that the framing matrix of four (4) unscaled pels can possess. Thus, a lookup table can be established identifying the correspondences between the sixteen (16) possible combinations of white and black unscaled pels in the framing matrix and the values of the four (4) scaled pels based on their positions within the matrix. This lookup table is illustrated in FIG. 5 for the scaling ratio of two (2) used in this example. The table of FIG. 5 relates to FIG. 3 and FIG. 4 in that FIG. 3 is the scaled to unscaled pel pattern, FIG. 4 displays the sixteen (16) possible unscaled pel values for that pattern and numbers them 0 through 15, and FIG. 5 shows the related lookup table, with a horizontal row 50 of input addresses ranging from 0 to 15 and matching the combinations of input pel values from FIG. 4, each producing a vertical column 51 of output data, specifying scaled pel values for four (4) scaled pels. Note on FIG. 3 that for this particular scaling, a magnification by a factor of two (2), there are four (4) output pels (scaled pels 11) produced from the same 4 input pels. This will not be generally true, in that, more or less output pels may be produced from a set of input pels. In the case of reduction, at times, there may be no output pels produced from a specific set of input pels.

Figure 6:
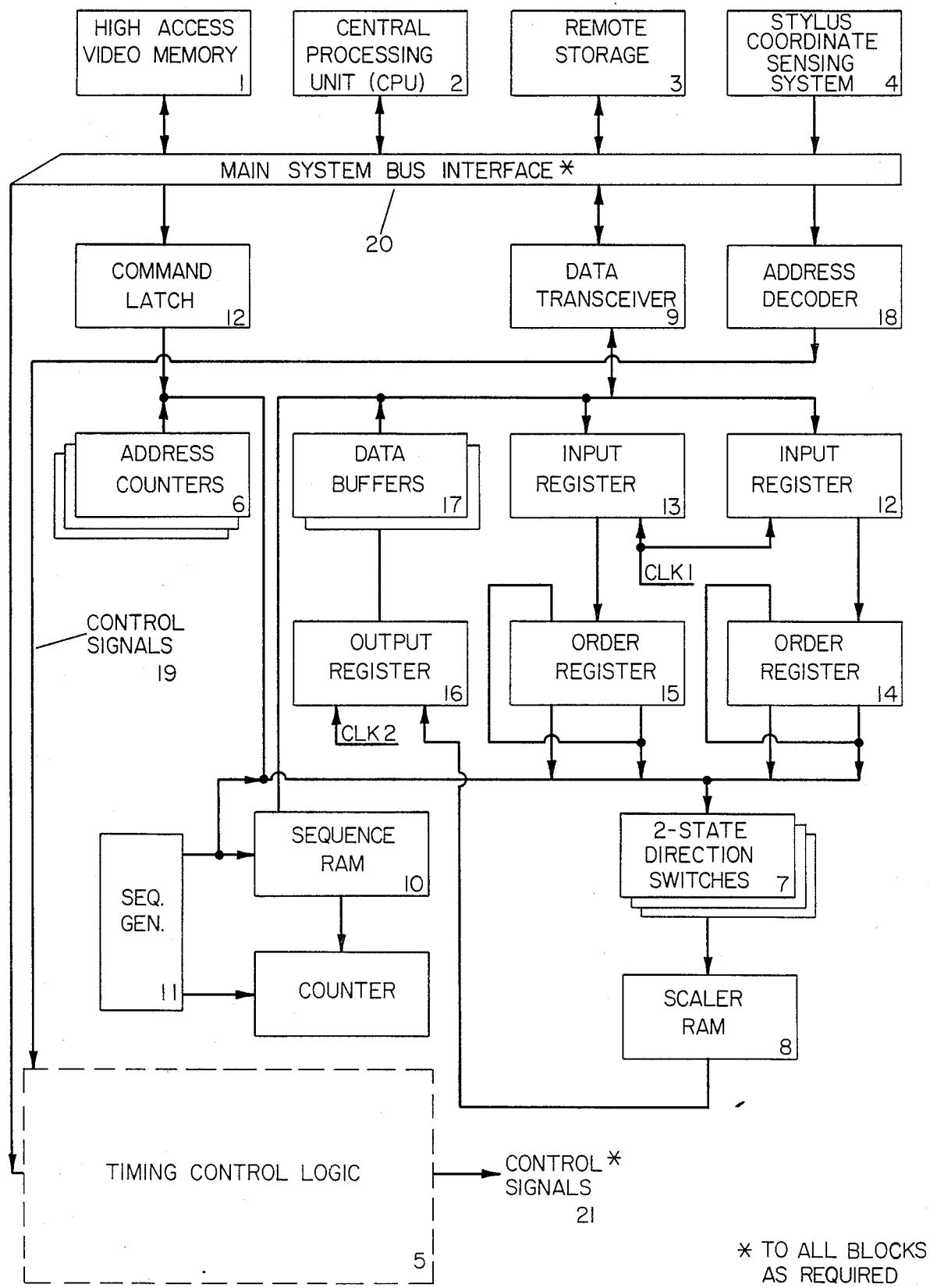
FIG. 6 is a block diagram showing the components and subsystems of the preferred embodiment of the present invention and their functional relationships.

This lookup table, and those for any other scaling ratios are prepared one time, manually, based on visual inspection of graphic overlays, and are stored in nonvolatile memory. This lookup table representing a scaling ratio of two (2) will be used in the following example to illustrate the scaling process as performed by the components and subsystems of the preferred embodiment of the present invention which are represented in FIG. 6.

Figure 7:
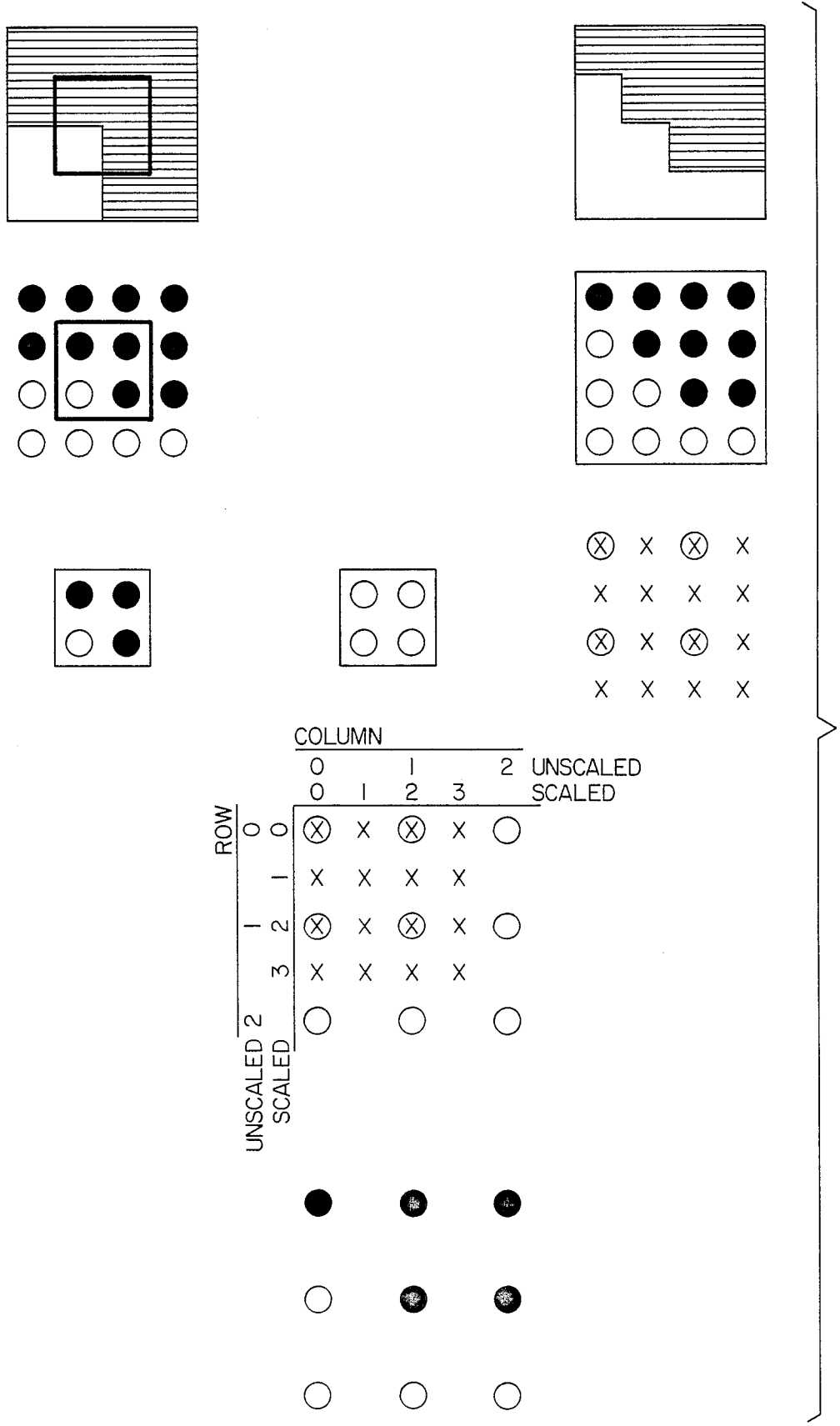
FIG. 7 is a symbolic diagram of a hypothetical 2×2 pel portion of a display scaled up by a factor of two (magnification) 2 to a 4×4 pel display, and the correspondence overlay showing all pattern iterations, pels of the scaled display and pels of the unscaled display employed in the scaling process.
Figure 10:
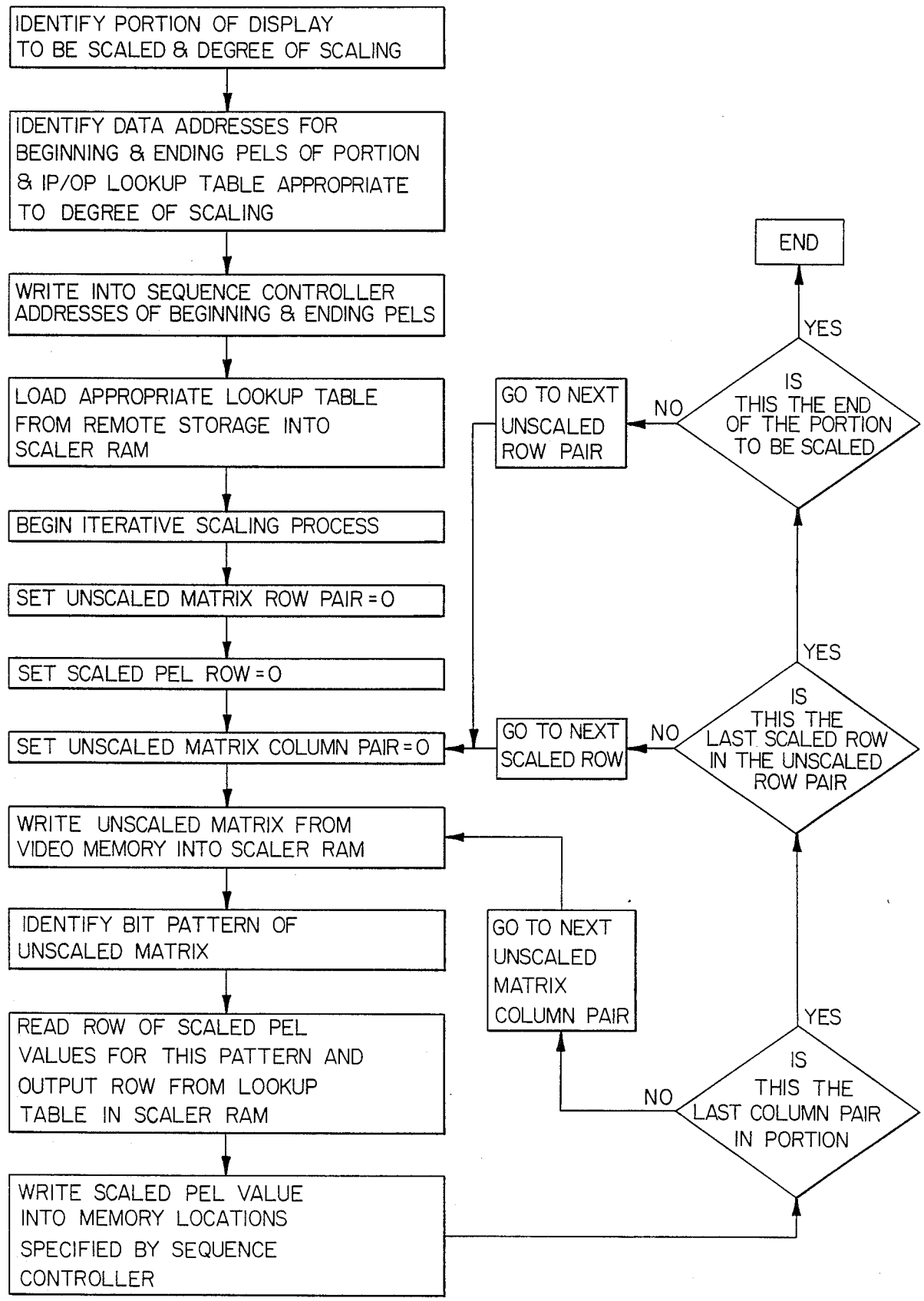
FIG. 10 is a flow chart summarizing sequentially the steps of the scaling process illustrated in FIGS. 8 and 9.

FIG. 7 illustrates the hypothetical scaling of a 2×2 pel portion of a display by a ratio of two (2) to a 4×4 pel magnification. Because a scaling ratio of two (2) iterates the overlay pattern every two (2) scaled pels, two (2) iterations will be needed both horizontally and vertically. Sequential protocol in the preferred embodiment of the present invention is such that processing proceeds from left to right in the first row of the image portion to be scaled, then the second row, etc. Thus, the processing sequence is as follows.

| | Unscaled Display Pel Framing Matrix | | | | Scaled Display Pels to be Determined | | | |
|---|---|---|---|---|---|---|---|---|
| 1. | 0h | 0v, | 1h | 0v | | | | |
| | 0h | 1v, | 1h | 1v | 0h | 0v, | 1h | 0v |
| 2. | 1h | 0v, | 2h | 0v | | | | |
| | 1h | 1v, | 2h | 1v | 2h | 0v, | 3h | 0v |
| 3 | 0h | 0v, | 1h | 0v | | | | |
| | 0h | 1v, | 1h | 1v | 0h | 1v, | 1h | 1v |
| 4. | 1h | 0v, | 2h | 0v | | | | |
| | 1h | 1v, | 2h | 1v | 2h | 1v, | 3h | 1v |
| 5. | 0h | 1v, | 1h | 1v | | | | |
| | 0h | 2v, | 1h | 2v | 0h | 2v, | 1h | 2v |
| 6. | 1h | 1v, | 2h | 1v | | | | |
| | 1h | 2v, | 2h | 2v | 2h | 2v, | 3h | 2v |
| 7. | 0h | 1v, | 1h | 1v | | | | |
| | 0h | 2v, | 1h | 2v | 0h | 3v, | 1h | 3v |
| 8. | 1h | 1v, | 2h | 1v | | | | |
| | 1h | 2v, | 2h | 2v | 2h | 3v, | 3h | 3v |

FIG. 12 shows the relationship for bits out versus bits in for a number of scaling factors. For example, a magnification of two-to-one requires two output bits for each input bit. A magnification of seven-to-five is more complex, requiring two bits out for one bit in, followed by one bit out for one bit in, followed by two bits out for one bit in, followed by one bit out for one bit in, and then repeating. This is shown by five lines in the table under magnify 7/5.

FIG. 13 is the actual scaling table for several scaling factors. Each line of this table has sixteen binary digits representing the pel output for each of the possible sixteen framing pel inputs shown in FIG. 4. At the right of each line is the horizontal and vertical position data within the cell for which that line applies. At the top of each segment of the table is the applicable scaling ratio with numerator (NEM) and denominator (DOM). Thus the first line is for the scaling ratio 6/5, for horizontal position 0 and vertical position 0 within the cell. The framing pattern 0 for this position will produce a 0 bit out. The pattern 1 would produce a 1 bit out. Tables 12 and 13 for other scaling ratios can be manually produced, as were these tables, by application of the principles described herein.

FIGS. 8 and 9 illustrate the above sequence as performed by the components and subsystems of the preferred embodiment as described below.

The preferred embodiment of the present invention includes high access video random access memory 1 (FIG. 6) which allows for the reading and writing of successive bits either horizontally or vertically via ports independent of the port employed for video refresh. This memory component is described in a co-pending application U.S. patent application Ser. No. 110,007 filed Oct. 19, 1987 by Tutt et al for "High Access Video Random Access Memory", which is hereby incorporated by reference.

The preferred embodiment of the present invention incorporates central processing unit (CPU) 2 as a means to control the execution of the major steps of the rotation process and the relocation of rotated blocks to their new locations in the high access video memory 1. CPU 2 can be any of the variety of central processors commercially available, either in chip form, such as the NS32016 High Performance Microprocessor produced by National Semiconductor Corporation, 2900 Semiconductor Drive, P.O. Box 58090, Santa Clara, Calif. 95052-8090, or in board or module form, with support circuits such as the ICM3216 board produced by National Semiconductor Corporation, ICM Products Group, 15201 N.W. Greenbrier Parkway, Beaverton, Or., 97006, the reference manuals and instruction sheets for all of which are hereby incorporated by reference.

The preferred embodiment of the present invention incorporates a remote storage 3 as a means to store the various address sequencing tables used in the scaling process as described below. Remote storage 3 can be any of the variety of magnetic data storage devices commercially available, such as the ImageFile II produced by Interand Corporation, 3200 W. Peterson Ave., Chicago, Ill., the reference and operation manuals for which are hereby incorporated by reference, or the Floppy Disk Drive MP-F73W-00D produced by Sony Corporation of America, 655 River Oaks Parkway, San Jose, Calif. 95134. More generally, Remote Storage 3 can be any non-volatile storage device including hard disk, floppy disk, ROM, etc., which can be accessed by CPU 2.

The preferred embodiment of the present invention incorporates and applies stylus coordinate-sensing system 4 of U.S. Pat. No. 4,603,321 issued July 29, 1986 to Reiffel et al for "System for Sensing Spatial Coordinates", which is hereby incorporated by reference. This system continuously detects and transfers to CPU 2 the horizontal and vertical coordinates of a hand-manipulated stylus relative to the display screen of any video system into which it has been incorporated. In the preferred embodiment of the present invention, stylus coordinate-sensing system 4 is used to identify the portion of the displayed still image to be scaled. For example, stylus coordinate-sensing system 4 can define as an area to be operated on the rectangle whose diagonally opposite corners are any two consecutive points on the screen touched by the stylus. In the present invention, this area definition is converted into the sequencing information required for that area by CPU 2.

The preferred embodiment of the present invention incorporates timing and control logic 5 circuitry as a means to control the timing and counting of sequences used by the scaling process. The timing and control logic 5 incorporates commercially available integrated circuits in a conventional network designed to meet the timing requirements of the scaling process as described below and which is apparent to those skilled in the art.

Address decoder circuit 18 decodes binary data on main system interface bus 20 into individual control signals 19, which go to the timing and control logic 5, containing counting and logic circuits. These logic and timing circuits in turn produce signals 21 which control signal flows, signal directions, enable chips and otherwise perform the standard control functions well-known to those skilled in the art in order to produce the operation as described herein.

The preferred embodiment of the present invention also incorporates as functional components commercially available integrated circuits listed with their producers in the IC Master catalogue published by Hearst Business Communications, Inc./UTP Division, 645 Stewart Ave., Garden City, N.Y. 11530 hereby incorporated by reference. Additional literature describing these commercial components and their operation and interconnection is available from the respective manufacturers listed for each device in the IC Master.

| # | COMPONENT | IC Master # |
|---|---|---|
| 6 | Address Counters | 74F161 |
| 7 | 2-State Direction Switches | 74AS157 |

-continued

| # | COMPONENT | IC Master # |
|---|---|---|
| 8 | Scaler RAM | 2147-1 |
| 9 | Data Transceiver | 74F245A |
| 10 | Sequence RAM | 74S189A |
| 11 | Sequence Generator | 74F161 |
| 12 | Input Register | 74F676 |
| 13 | " | " |
| 14 | Order Register | 74AS175 |
| 15 | " | " |
| 16 | Output Register | 74F675 |
| 17 | Data Buffers | 74F373 |
| 18 | Address Decoder | 74ALS677 |
| 5 | Timing and Control Logic Counter | 74F161 |

The process of scaling is initiated when CPU 2 receives from stylus coordinate-sensing system 4 the coordinates of the rectangular display area to be scaled, and identifies the addresses of the beginning and ending pels (relative to the mapping of the display in high access video memory 1). Selection of the desired scaling factor is accomplished via a rotating switch or application of the stylus to a symbol printed on the screen of stylus coordinate sensing system 4.

Facilitated by counting devices identified as address counters 6, CPU 2 also causes the loading from remote storage 3 the corresponding lookup table into scaler RAM 8, via transmission path including data transceiver 9 and control devices 2-state direction switches 7; and the corresponding sequence data into sequence RAM 10, via data transceiver 9. The CPU 2 then begins the scaling process.

Step 1 begins in the upper left corner of FIG. 8: the four (4) bits of the first unscaled framing matrix (0h 0v, 1h 0v, 0h 1v, and 1h 1v) are entered from high access video memory 1 into scaler RAM 8 address lines. The matrix pattern is recognized as pattern 11 (see FIG. 4). Sequencing then causes the output of the two (2) values in the Row 0 lookup table under pattern 11. These are transmitted to high access video memory 1, where CPU 2 software directs them to replace the data in the first two (2) locations of the area being scaled (beginning at top left and moving to the right).

Then in step 2, the next two (2) bits of unscaled display data are entered to form the second framing matrix, which is recognized as pattern 15 (see FIG. 4). Sequencing again causes the output of the two (2) values in the Row 0 lookup table, this time under pattern 15. Again, these are transmitted to the high access video memory 1 and stored in the next two (2) horizontal locations.

In step 3, the first framing matrix is reentered into the scaler RAM 8 and again recognized as pattern 11. This time sequencing refers to the Row 1 lookup table and causes the output of the two values under pattern 11. These are then transmitted to the high access video memory 1 and caused by CPU 2 to replace data in the first two (2) locations of the second row of the portion of the image being scaled.

Step 4 repeats the shift to the right as step 2 did relative to step 1. Step 5 begins in the upper left corner of FIG. 9. The framing matrix has now shifted down one display row, and the data entered are for unscaled display positions 0h 1v, 1h 1v, 0h 2v, and 1h 2v. The remainder of step 5 and steps 6, 7 and 8 are identical to their counterparts in FIG. 8, including the use of the same two lookup tables (Row 0 and Row 1).

As was discussed earlier, the pattern relating scaled to unscaled pels keeps shifting in a systematic fashion, related to the scaling ratio, and returning to the same point periodically. The unit of periodicity has been referred to as a cell. To perform the scaling, the position within the cell, both vertically and horizontally, must be taken into account. This information must be made available to scaler RAM 8 in the form of address information, where it will address the proper data locations in RAM 8, causing the correct portion of the table loaded therein to be read out and used as the scaled image data. Thus scaler RAM 8 receives address information from the framing pels, sequence generator 11 and command latch 12. The framing pels constitute the unscaled pels which will contribute to the definition of the scaled pels. Sequence RAM 10 and sequence generator 11 together with a counter, using a table downloaded to sequence RAM 10, develop the horizontal position data as the system sequences through the cell and across the horizontal line. Command latch 12 transfers data on the vertical position within the cell from CPU 2 which keeps track of vertical position within the cell. Thus, from the preloaded tables, the CPU software, and the unscaled pels, the new scaled pels are looked-up in scaler RAM 8 look-up table.

Thus, horizontal sequence for the processes described above is produced by sequence RAM 10, sequence generator 11, and their associated counter; and vertical sequence is produced by command latch 12.

The foregoing description was limited in size so as to simplify explanation of the scaling process. The following will describe the operation of the system more fully in terms of its components and subsystems.

Assume a rectangular area to be scaled has been defined by selecting two (2) points on the unscaled image with stylus system 4 or by any other appropriate input selection device. Scaling will begin at the upper left hand corner of the rectangular area to be scaled.

The preferred embodiment of the present invention uses shift registers and 2-state direction switches as input devices to scaler RAM 8, the functions of which are described below. The first sixteen (16) bits of image data in the first and second raster (horizontal) lines of the rectangular area to be scaled are loaded from the high access video memory 1 into two (2) 16-bit parallel-in-serial-out shift registers, identified as input registers 12 and 13. From these, the data are loaded sequentially into the two (2) subsequent 2-bit serial-in-parallel-out shift registers identified as order registers 14 and 15, respectively. As the initial shift registers are emptied, sequencing loads the next sixteen (16) image data bits of the first two (2) raster lines into them. This process repeats until the first two (2) raster (horizontal) lines of data within the scaling rectangle have been processed, after which the process shifts to the left ends of lines 3 and 4 of the scaling rectangle; and so on until the entire scaling rectangle has been processed.

The 2-bit shift registers, 14 and 15, are "flip-flops" in that their left and right contents can be interchanged, reversing the order in which their contents are subsequently used to address scaler RAM 8. Initially, their contents of four (4) bits, representing a 2×2 matrix of adjacent display pels or framing matrix, are loaded into scaler RAM 8. Subsequent framing matrices are loaded by adding the next vertical pair of bits issuing from registers 12 and 13 and reversing the positions of this and the preceding pair before using them to address scaler RAM 8.

By addressing scaler RAM 8, the framing matrix is compared with the possible lookup table inputs, via the horizontal and vertical sequences of white and black pels, so as to identify which of the sixteen (16) possible combinations it possesses. For each framing matrix loaded, sequencing information from sequence RAM 10 and sequence generator 11 also addresses the scaler RAM 8 thus identifying which if any pels of the scaled display are to be determined at that instant. (In reductions, there are no scaled pels to be determined for some of the framing matrices.) If the determination of a scaled pel is specified by sequencing, the value indicated for that pel by the matching combination in the lookup table will be read as output from the scaler RAM 8. In other words, an address consisting of both framing matrix bits from order registers 14 and 15 and bits from sequencer RAM 10 cause scaler RAM 8 to output the bits, if any, appropriate to the current sequence position for the current framing matrix data.

As output values are generated, they are loaded into the 16-bit serial-in-parallel-out shift register 16. When this register is full, sequencing causes its contents to be transferred, via data buffers 17 and data transceiver 9 to the locations in the high access video memory 1 appropriate to the specified scaling, as governed by CPU 2.

The set of 2-State direction switches 7 control the loading of image data, addresses, and sequencing data into the scaler RAM 8, and is governed by sequencing.

Alternative embodiments of the present invention could divide the processing functions between software and hardware differently. However, the preferred embodiment is chosen as having the optimum combination in terms of operating speed and hardware economy. The preferred embodiment of the present invention can scale to any ratio n/m (where n and m<16, and $\frac{1}{2}$<n/m<2) an image portion of 864×1200 pels in a maximum time of 3 seconds.

Figure 11:
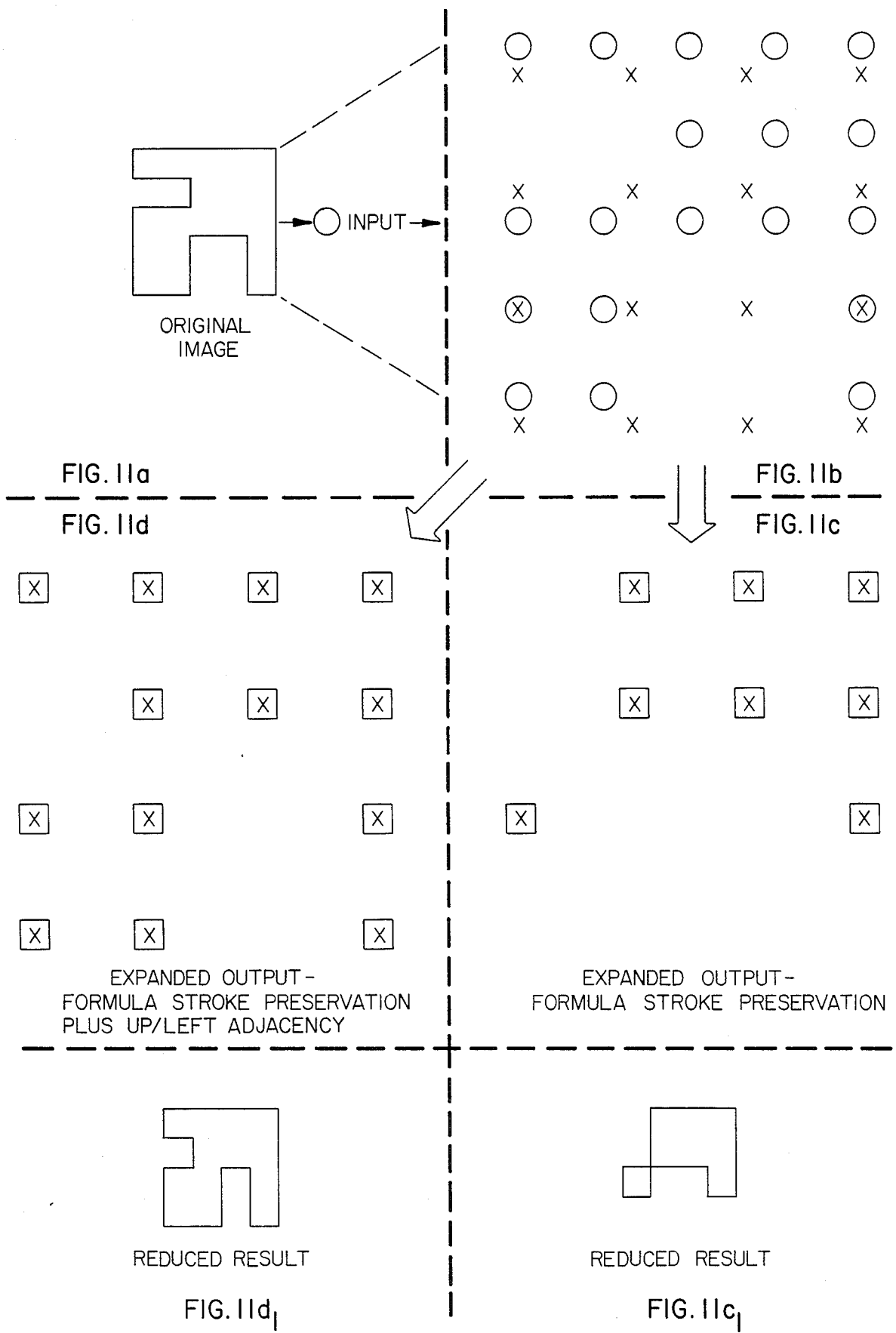
FIG. 11 illustrates the process of reducing an image and the effect of adding to the stroke preservation method the up/left adjacency used to minimize information loss in image reductions.

The foregoing has described the function of the present invention by examples of its enlargement of images. The present invention also reduces images with equal facility and by the identical process and stroke preservation principle as employed in enlargement. FIG. 11 illustrates the reduction of an image to a ratio of 3-to-4, much as FIG. 2 and FIG. 7 illustrated the enlargement process.

Section A of FIG. 11 portrays the image to be reduced. Section B shows the array of input pels representing the unscaled image expanded to three-pel-location intervals and superimposed on the array of output pels expanded to four-pel-location intervals (the opposite of the interval assignments that would pertain in an enlargement: see FIG. 2). Section C of FIG. 11 shows the still expanded matrix of output pels representing the scaled image as determined by the stroke preservation principle described above for enlargement. Section C1 shows the scaled image reconstituted with all relevant pels adjacent as it would be on the display screen. Comparison of the scaled image C1 with the unscaled, A reveals considerable loss of image data, as is to be expected in any reduction, but in this case resulting in a scaled image unacceptably unlike the unscaled image.

Accordingly, the preferred embodiment of the present invention includes for reductions a transfer principle identified as "up/left adjacency" in addition to the stroke preservation principle employed for enlargement. This principle simply adds to stroke preservation the assignment of black to any output pel in a location in the overlay that is immediately adjacent to an input (unscaled) pel location above and/or to the left containing a black input pel; or similarly adjacent to a horizontal, vertical or diagonal stroke formed by two or more black input pels.

Section D of FIG. 11 shows the still expanded matrix of output pels resulting from the application of both the stroke preservation and up/left adjacency principles to the overlay in Section C; and Section D1 shows the reconstituted version thereof as it would appear on the display screen. Comparison of the reduced image in Section D1 with the unscaled image in Section A reveals a retention of image integrity far superior to that obtained by stroke preservation alone, and given the extremely small size of the original image, a quality of scaled image far superior to any obtained by prior art methods.

The lookup tables, of the present invention, that provide the output pel values for specific scaling ratios can be tailored manually somewhat beyond the principles described above, based on empirical evaluation of actual scaled image displays, so as to maximize image quality for any given scaling factor.

Accordingly, the present invention affords a practical and economical means for scaling video images without the need for more image data than is already displayed, and while maintaining the integrity of shape of white/black boundaries within the image.

Although the invention has been described in terms of a preferred embodiment, it will be obvious to those skilled in the art that many alterations and modifications may be made without departing from the invention. Accordingly, it is intended that all such alterations and modifications be included within the spirit and scope of the invention as defined by the appended claims.

What is claimed is:

1. A method for scaling an unscaled video image by a predetermined scaling ratio to produce a scaled video image, wherein the scaled and unscaled video images each comprise a plurality of image pels, the method comprising the steps of:
    generating a lookup table comprising a plurality of scaled image pel values, wherein th particular scaled image pel values are dependent upon the predetermined scaling ratio;
    establishing a framing matrix of unscaled image pels for each scaled image pel;
    successively reading out of the lookup table scaled image pel values for each of the scaled image pels, wherein the particular scaled image pel value read out of the lookup table for a particular scaled image pel is dependent upon the framing matrix established for that particular scaled image pel; and
    generating a scaled video image by assembling the scaled image pel values read out from the lookup table.

2. An apparatus for scaling an unscaled video image by a predetermined scaling ratio to produce a scaled video image, wherein the scaled and unscaled video images each comprise a plurality of image pels, comprising:
    means for generating a lookup table comprising a plurality of scaled image pel values, wherein the particular scaled image pel values are dependent upon the predetermined scaling ratio;
    means for establishing a framing matrix of unscaled image pels for each scaled image pel;
    means for successively reading out of the lookup table scaled image pel values for each of the scaled image pels, wherein the particular scaled image pel value read out of the lookup table for a particular scaled image pel is dependent upon the framing matrix established for that particular scaled image pel; and
    means for generating a scaled video image by assembling the scaled image pel values read out from the lookup table.

* * * * *